United States Patent [19]

Wetmore

[11] 4,176,863
[45] Dec. 4, 1979

[54] LARGE DIAMETER DUCTS FOR USE IN THE OCEAN

[75] Inventor: Sherman B. Wetmore, Westminster, Calif.

[73] Assignee: Global Marine, Inc., Los Angeles, Calif.

[21] Appl. No.: 886,904

[22] Filed: Mar. 15, 1978

[51] Int. Cl.² .............................................. F16L 3/00
[52] U.S. Cl. ...................... 285/18; 138/155; 166/208; 166/315; 285/114; 285/61; 285/133 R; 285/137 R; 285/140; 285/223
[58] Field of Search ............... 285/114, 18, 133 A, 285/133 R, 138, 140, 61, 223, 137; 166/206, 208, 243, 315; 138/107, 108, 113, 114, 118, 119, 155; 37/58

[56] References Cited

U.S. PATENT DOCUMENTS

| 833,426 | 10/1906 | Taube | 138/107 X |
|---|---|---|---|
| 1,647,386 | 11/1927 | Weis | 285/133 A |
| 2,614,585 | 10/1952 | Waystaff | 138/55 X |
| 2,668,066 | 2/1954 | Stadelhofer | 285/133 R |

FOREIGN PATENT DOCUMENTS 1242536  8/1971  United Kingdom ............... 285/114

Primary Examiner—Dave W. Arola
Attorney, Agent, or Firm—Christie, Parker & Hale

[57] ABSTRACT

A large diameter duct structure is adapted for vertical disposition in an ocean. An elongate tensile core assembly is adapted to be supported at one end, as from a floating platform, and to extend downwardly a desired distance. A plurality of duct wall sections, each of selected length, are alignable in serial order to define a tubular assembly having a diameter substantially greater than that of the core. Support means are engageable with the core at selected locations along the core and with the wall sections. The support means support the wall section substantially concentrically about the core and secure the wall sections from movement relatively along the core. Seals are engageable between the ends of adjacent wall sections disposed about and along the core, and define substantially liquid-tight connections between the wall sections. When the several wall sections are serially disposed along the core and are supported on the core with the seals engaged between adjacent wall sections, the result is a fluid flow duct of large diameter in which the weight of the duct is supported by the core which is loaded in tension below its upper end.

18 Claims, 8 Drawing Figures

LARGE DIAMETER DUCTS FOR USE IN THE OCEAN

FIELD OF THE INVENTION

This invention pertains to large diameter fluid flow ducts for use in ocean engineering and the like. More particularly, it pertains to such ducts in which the weight of the duct is supported by a tensile core within the duct.

BACKGROUND OF THE INVENTION

Review of the Prior Art and Its Problems

Many ingenious and sophisticated proposals have been made in the field of ocean engineering which call for the use of large diameter vertical ducts of great length and which extend from at or near the ocean surface to lower ends unconnected to the ocean floor. These proposals include concepts for ocean thermal energy conversion and for mariculture.

The ocean thermal energy conversion concepts propose to use the difference in thermal energy levels between warm surface water and colder deep water to generate electricity, for example. The available energy level difference is low, and so these proposals rely on the use of very large quantities of warm and cold water, and call for the necessary large volumes of deep ocean cold water to be brought to the water surface through very large vertical ducts of great length.

The mariculture proposals typically call for large quantities of cold nutrient-rich deep ocean water to be brought to the warmer surface portions of the ocean to provide food for the growth of ocean plants or animals. For example, one proposal calls for kelp to be grown on frames located about 60 feet or so below the ocean surface and to be nourished by nutrient-rich water brought up to the vicinity of the frames from 1500 feet or more below the ocean surface.

These proposals, and others similar to them, have the common feature of requiring the use of very long, large diameter vertical ducts through which water from deep in the ocean may flow upwardly. The rate of water flow through the ducts, called upwelling ducts, would be relatively low, and thus the pressure differential across the walls of the duct would be correspondingly low, especially if the water in the duct is not carried far above the ocean surface before being discharged from the duct.

The approaches suggested to date for implementing these proposals have described the water upswelling ducts in conventional terms. Thus, these large diameter water upwelling ducts have been described in the various proposals as being stiff pipes, albeit of large diameter, suspended from upper ends supported on suitable platforms, such as floating or submerged buoyant platforms.

Any structure which extends vertically for any significant distance in the ocean will encounter at least one ocean current. Currents impose drag forces upon such structures. The larger the structure, the greater its profile (effective area) presented to the current, and therefore the greater the drag forces which a given current will impose on the structure. These drag forces impose bending loads on the structure, and the longer the structure, the more severe the resulting bending stresses and deflections.

The problem of ocean current drag forces and of the bending stresses produced by such forces is a significant difficulty in the offshore drilling industry in regard to the riser pipes which are used to conduct drilling mud, during the drilling of a subsea oil or gas well, from the well bore to the surface drilling platform. Curent induced bending stresses are so great in these riser pipes that the pipes must be made very heavy, i.e., with thick walls, to enable them to withstand the bending stresses. This problem is such that, because of it, offshore drilling operations today are effectively limited to water depths of about 1000 feet or so. This limit is imposed principally by the riser pipes.

The riser pipes now in use in 1000 foot water depths by the offshore drilling industry are relatively large in diameter, but they are very much smaller than the diameter of the much larger upwelling ducts called for in the various ocean engineering proposals reviewed above. The very large, very long upwelling ducts proposed would be subjected to very large drag forces and very high levels of bending stress. If upwelling ducts of conventional description (stiff, continuous pipes and the like) are to be used, they must be extraordinarily heavy, thickwalled and costly, and very difficult and expensive to assemble and put into place. The problems associated with these upwelling ducts are a major impediment to the economic implementation of the proposals for development of mariculture and ocean thermal energy conversion.

A need is therefore seen to exist for novel large diameter duct structures of great length adapted to be suspended in an ocean, and yet be capable of withstanding or accommodating current-induced drag loads and the effects of such loads.

SUMMARY OF THE INVENTION

This invention responds to the need identified above. It provides several novel large diameter, very long suspended duct structures which can be used to advantage in the ocean to implement mariculture and ocean thermal energy conversion proposals. The improved duct structures are simple and inexpensive to provide and are readily assembled and put into place with existing equipment. While these duct structures will necessarily be subject to large current-induced drag forces, they accommodate such forces by being flexible. The weight of the duct is supported by a tensile core assembly inside the duct where the significant loads to which it is subjected are the loads due to its own weight and the weight of the duct elements connected to it. Bending stresses in the ducts are held to very low levels by the use of flexible, stress-barrier connections between duct sections of reasonable and readily handled length. Because stresses in the several duct sections are low, the duct walls may be very thin and only thick enough to withstand the low hydrostatic pressure differentials encountered across the walls and to withstand the small local bending moments existing in the duct wall sections between the structures (spiders) by which the several duct wall sections are supported on the tensile core. This results in the overall duct, even though of great length, being relatively light in weight and easily suspended from a platform of reasonable size. Dynamic motions induced by a float support for the duct in response to waves, and the action of the waves themselves on the duct, also act on the duct to induce bending stresses. By essentially decoupling each section of the duct from the others, these dynamic forces are not allowed to transmit up and down the duct walls.

Generally speaking in terms of structure, this invention provides a large diameter duct structure adapted for vertical disposition in an ocean. An elongate tensile core for the duct is adapted to be supported at one end thereof and to be disposed downwardly from the one end. A plurality of duct wall sections of selected length are serially alignable to define a tubular assembly of diameter substantially greater than that of the core. Support means are engageable with the core at selected locations along the core and with the wall sections. The support means serve to support the wall sections substantially concentrically about the core and to secure the wall sections from movement along the core. Flexible seal means are engageable between the adjacent ends of adjacent wall sections disposed along and about the core to define substantially liquid-tight connections between adjacent sections. When the core, wall sections, support means and seal means are assembled, the assembly is suspended from the one end of the core to provide a flow duct of desired overall length in which the weight of the assembly is carried by the core.

DESCRIPTION OF THE DRAWINGS

The above-mentioned and other features of this invention are more fully set forth in the following detailed description of preferred embodiments of the invention, which description is presented with reference to the accompanying drawings, wherein.

DESCRIPTION OF THE ILLUSTRATED EMBODIMENTS

Figure 1:
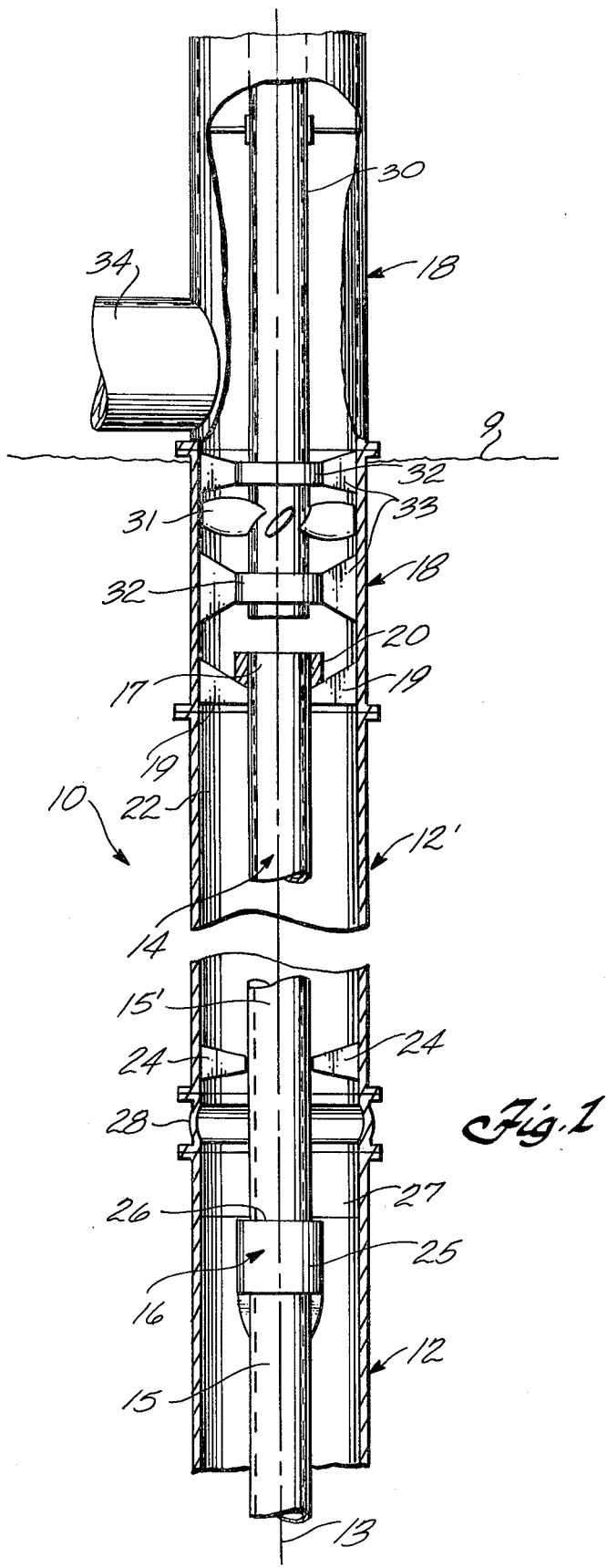
FIG. 1 is a fragmentary cross-sectional levation view of a portion of an upwelling duct and pump arrangement according to this invention.

A duct assembly 10 useful in ocean engineering to provide upwelling flow of water from deep in an ocean 8 to adjacent the water surface 9 is shown in FIG. 1. Duct assembly 10 may be used to bring to surface 9 cold water from depths of 2000 feet or more in an ocean thermal energy conversion facility, or for use to bring nutrient-rich water from comparable depths to near the water surface for use in a mariculture facility. Duct 10 is composed of a plurality of thin-walled, large diameter duct wall sections 12 which preferably are, but need not be, essentially identical to each other. Duct wall sections 12 are of selected length and are of tubular configuration. The wall sections are arranged to be coaxially aligned in serial order along and about a central axis 13 of the duct. Duct assembly 10 also includes an elongate tensile core 14 which, in duct assembly 10, is disposed along axis 13. Core 14 is defined by a plurality of pipe lengths 15 which are serially connected by threaded couplings 16 between the adjacent pipe lengths. Pipe lengths 15 are hollow, as shown in FIG. 1.

The assembled string of pipe lengths, i.e., core 14, is arranged to be suspended at its upper end 17 from a suitable platform or other structure located at or near (either above or below) water surface 12; in the case of the arrangement shown in FIG. 1, the structure from which the core is supported may be a floating buoyant platform, such as a suitable ship or the like. The support of the upper end of duct core 14 is provided by a vertically disposed tubular housing 18 which is connected to the floating platform (not shown) and which extends a short distance below water surface 9. Housing 18 has a diameter corresponding to the diameter of the uppermost one 12' of the duct wall sections. A plurality of yoke support brackets 19 are secured to the inner diameter of support housing 18 at its lower end and extend radially inwardly toward axis 13. At their inner ends, the brackets cooperate with the lower face of a circumferential hub 20 secured to the upper end 17 of core 14 as defined by the uppermost one 15' of the core pipe lengths. Preferably hub 20 is merely rested upon brackets 19 so that the upper end of the core can pivot in its supporting housing to adjust to and accommodate bending loads applied to the duct by ocean current drag forces.

The uppermost one 12' of the duct wall sections is connected to the lower extent of housing 18 concentrically about core 14 thereby to define an annular liquid flow passage 22 between the exterior of the core and the inner surfaces of the wall section. Passage 22 extends along the entire length of the duct, which length may be on the order of 2000 feet or more.

A plurality of spacer fingers 24 are secured to the inside of each wall section 12, including the uppermost wall section, adjacent its lower end to cooperate loosely with the exterior of the core. The several sets of fingers 24 serve to center the respective wall section relative to the core so that the wall section is positioned concentrically about the core. If desired, each set of spacer fingers 24 can be components of an annular, essentially open spider either permanently attached to the respective wall section or removably connected to the wall section.

The uppermost pipe length 15' of core 14 has a length which is somewhat greater than the length of the uppermost duct wall section 12', whereby the uppermost coupling 16 in the assembled core is disposed a short distance below the upper end of the first wall section below wall section 12'. The remaining pipe lengths 15 of the core are of the same length which preferably is equal to the length of the adjacent wall sections. Thus, the location of each coupling 16 between adjacent pipe lengths in core 14 is a short distance below the upper end of each of the wall sections located below uppermost wall section 12'.

Each of couplings 16 preferably is composed of an enlarged-diameter, faired, internally threaded box 25 into which is threaded the externally threaded lower end of the core pipe length immediately above it. Each box defines an upwardly open shoulder 26 at its upper end. Each shoulder 26 provides the means whereby the adjacent duct wall section 12 is supported by core 14. Such support is accomplished by the provision of a spider assembly 27 which preferably is releasably secured to each wall section 12 on its interior adjacent its upper end. Each spider assembly is an essentially open annular structure which has a plurality of radial fingers having inner ends on a circle of diameter greater than the outer diameter of each core pipe length but smaller than the outer diameter of each box construction 25. Accordingly, the lower central portion of each spider 27 is engageable with a shoulder 26 to support on the core the duct wall section to which the spider is releasably connected. That is, each wall section 12 is suspended by a spider 27 adjacent its upper end from core 14 at a location on the core just below the upper end of each wall section. Adjacent its lower end, each wall section carries a plurality of spacer fingers 24 (as shown in FIG. 1 with reference to uppermost wall section 12') which cooperate with the core to center the lower end of the wall section concentrically about the core.

Spiders 27 preferably are detachable from their respective wall sections to enable the several core pipe lengths to be removed from the wall sections for separate storage of the core lengths and the wall sections. If desired, however, the core lengths can be provided with their wall sections permanently attached.

The upper end of each wall section in duct 10 is spaced along axis 13 from the lower end of the wall section next above it. The spaces between adjacent wall sections are closed by annular flexible bellows-type seals 28. Seals 28 perform dual functions in duct 10. They define a portion of the outer walls of annular flow passage 22, and they also act as stress barriers in the large diameter tubular outer wall of the duct. Ocean currents moving past the vertically disposed duct will apply drag forces to the several wall sections. These drag forces result in bending stresses being developed within the wall sections. These bending stresses, however, are confined within the individual wall sections by the flexible seals between adjacent sections. Therefore, the level of bending stress encountered in any given wall section is very low. This situation enables the wall section to be defined, in regard to wall thickness and the material, principally in terms of the water pressure differential across the walls during use of the duct. Since the rate of water flow upwardly through the interior of the duct is relatively low, and because the height of the column of water within the duct is essentially equal to the depth of water outside the duct, this pressure differential is very low. The principal design criterion pertinent to the wall sections is that they be able to maintain their own shape. In the assembled duct 10, the wall sections function primarily as serially aligned curtains disposed concentrically about core 14 which is the principal load-carrying structural element in the entire duct assembly.

Duct assembly 10 may be assembled and put into place by equipment and procedures very similar to those which are used in assembling and putting into place a riser pipe of the type used in the offshore drilling industry. Individual core pipe lengths and wall sections are connected to the upper end of the portion of the duct already assembled. In this manner, the duct is assembled from its upper end so as to grow downwardly into the ocean to the desired depth.

Upwelling of ocean water through annular flow passage 22 will not occur naturally. Accordingly, a pump shaft 30 extends along axis 13 downwardly within duct support housing 18, as shown in FIG. 1, and adjacent its lower end carries an impeller 31. The pump shaft is supported above and below the impeller in suitable bearings 32 supported on bearing struts 33 extending radially inwardly from the inner walls of the tubular housing 18. The interior of housing 18 at and above the pump impeller is an extension of flow passage 22 which terminates in a lateral outlet 34 from housing 18 above the impeller.

In duct 10, the upper end of the uppermost core pipe length 15' is open, as is the lower end of the lowermost core pipe length. Accordingly, the total water flow area available in duct 10 is provided by the combination of the area of annular flow passage 22 and the open area of the core.

The core preferably is made as small in diameter as possible so that the bending stresses developed in the core are as low as possible. Preferably the diameter of the core is sufficiently low that the principal design criterion which must be observed in the core is the tensile load which the core must withstand, rather than the bending stresses which it must withstand.

Figure 2:
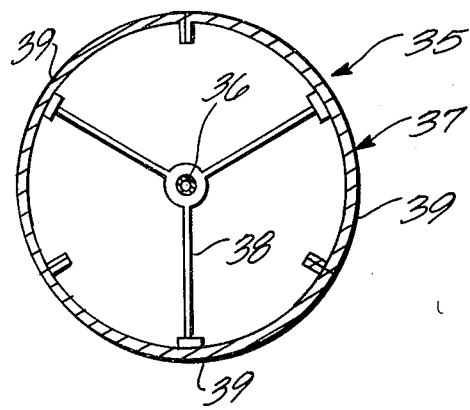
FIG. 2 is a transverse cross-section view of another upwelling duct according to this invention.

FIG. 2 is a cross-sectional view of another duct assembly 35 according to this invention. Duct 35 has a central tensile core 36 which may be defined of individual pipe lengths very similar to lengths of drill pipe as encountered in the oil and gas drilling industry. Each of a plurality of tubular elongate large diameter thin-walled wall sections 37 are supported on core 36 by suitable hanger spiders 38, and centering spiders, as described above. FIG. 2 shows the large difference in diameter which can exist between the wall sections and the core of a duct according to this invention. FIG. 2 also shows that the individual tubular wall sections 37 can be composed of a plurality of arcuate shell elements 39 which are connectible to each other to define the individual wall sections which are of circularly cylindrical configuration. Where the wall sections are defined by arcuate shell elements, the storage of the components of the duct, prior to assembly into the completed duct, is greatly facilitated.

Figure 8:
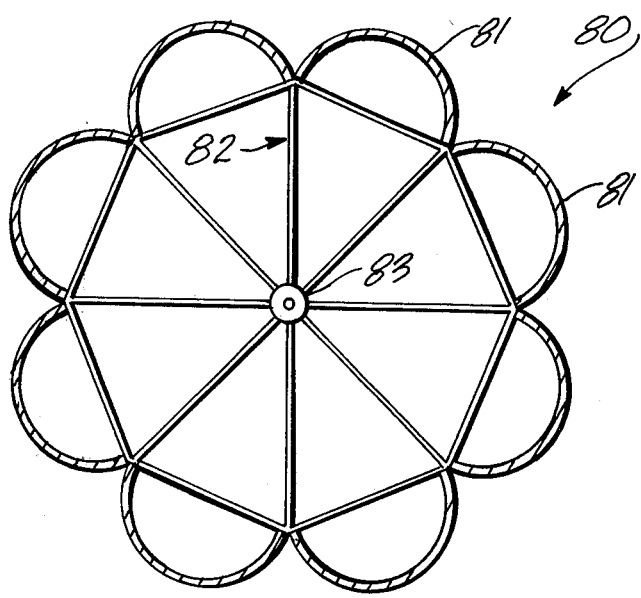
FIG. 8 is a transverse cross-section view of another duct which is similar in some respects to the duct shown in FIG. 2.

Another duct 80, shown in FIG. 8, is similar to duct 35 in that it is composed of wall sections 81 which are defined by three or more semi-circular shell elements; in duct 80, there are eight semi-circular wall sections which are connected, as by bolting, to spiders 82 spaced along a suitable tensile core 83. Duct 80 may have an effective diameter of from 20 feet to 50 feet or more. The pressure differential across the duct walls due to water flow in the duct may be small per unit area of duct wall, but large over the entire area of the wall. For example, the differential may be only 3 psi., but when applied over the surface of a large diameter duct, may be sufficient to cause buckling if the duct were circular in shape; the wall of a 50 foot diameter pipe would appear nearly flat locally. In duct 80, however, the semi-circular wall elements are better able to stand against and not buckle under the loads due to fluid pressure differentials.

Spiders 82, if desired, can be bolt-together structures for ease of storage prior to installation of the duct.

Wall elements 81 may be fabricated of fiberglass, if desired, so as to be light yet strong.

Figure 3:
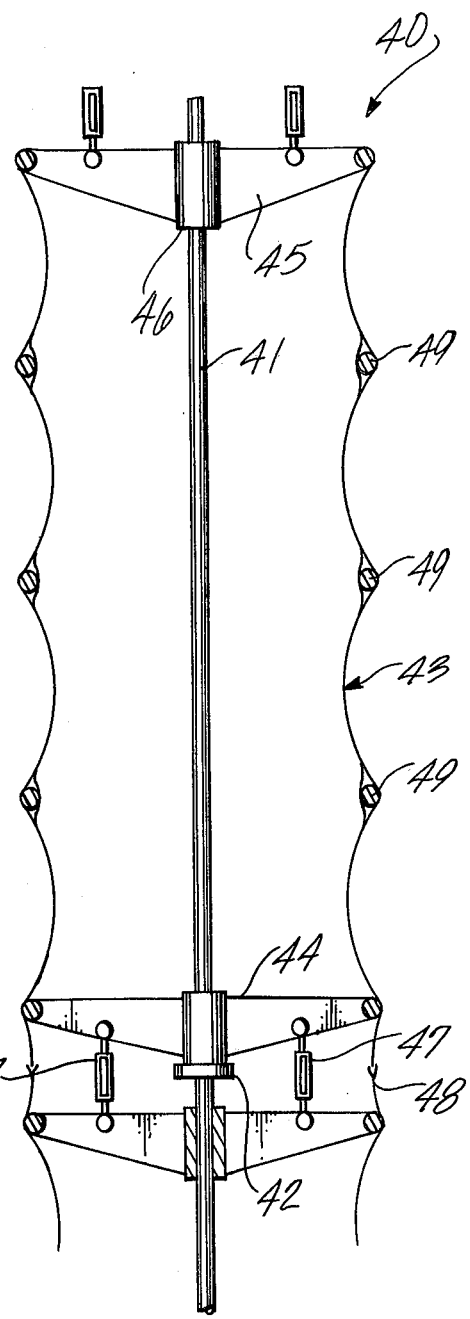
FIG. 3 is a longitudinal cross-section view of another upwelling duct according to this invention.
Figure 4:
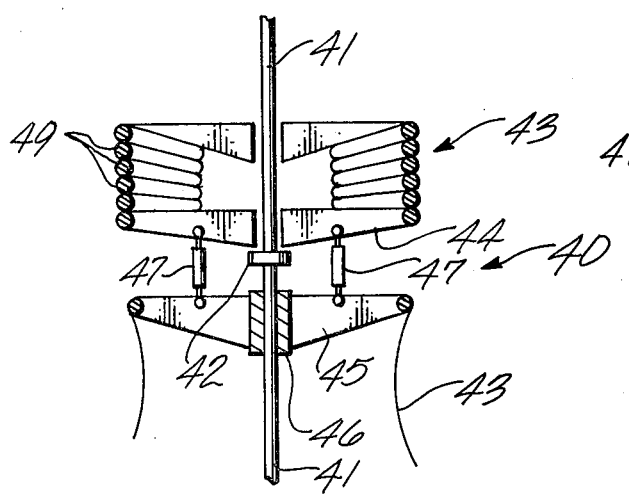
FIG. 4 is a view of the duct shown in FIG. 3 illustrating a stage in the assembly of the duct.

FIGS. 3 and 4 show another duct assembly 40. Duct 40 includes an elongate slender tensile core 41 which, as shown, is composed of a plurality of individual pipe lengths serially connectible by suitable couplings 42. Preferably the couplings have an enlarged diameter relative to the pipe lengths, as shown in FIGS. 3 and 4. The duct is also composed of a plurality of wall sections 43 which preferably are defined as flexible and collapsible tubes of desired diameter made of a water-impermeable fabric or other material. Each wall section includes a lower spider assembly 44 and an upper spider assembly 45 to which the flexible tubes are connected adjacent their upper and lower ends. Each lower spider 44 is centrally arranged to surround the core and to be supported by the upper portions of a core coupling 42. Each upper spider 45 has a central hub 46 which is slidable along the core.

The assembly of duct 40 is shown in FIGS. 3 and 4. An individual wall section, with spiders attached, is slipped over the uppermost core length in the assembled portion of the duct. This is done while the wall section is in its axially collapsed condition as shown in FIG. 4. The lower spider 44 of the added wall section is supported upon the uppermost coupling 42 of the core. The upper spider 45 of the wall section immediately below the added wall section is slid upwardly along the core until it is located just below the uppermost completed coupling in the core, and is connected to the lower spider 44 of the added cut section by tensioning devices, such as turnbuckles 47, to cause the wall section of which upper spider 45 is a component to be extended along the core.

The upper and lower extremities of the adjacent flexible wall sections are configured to mate with each other to define an annular liquid-tight closure and seal 48 between the adjacent wall sections. A plurality of stiffening hoops 49 are carried by the fabric wall section tube at appropriate intervals along its length to maintain the desired substantially cylindrical shape of the duct in use, and to accommodate the expected pressure differentials to which the duct will be subjected in use.

The nature of duct 40, with its flexible fabric wall sections, emphasizes the point that the outer walls of an upwelling duct according to this invention are essentially a curtain and partition and need no structural load-carrying characteristics of their own. It is the tensile cores of the present ducts which are relied upon to support their own weight and the weight of the duct wall sections.

Figure 7:
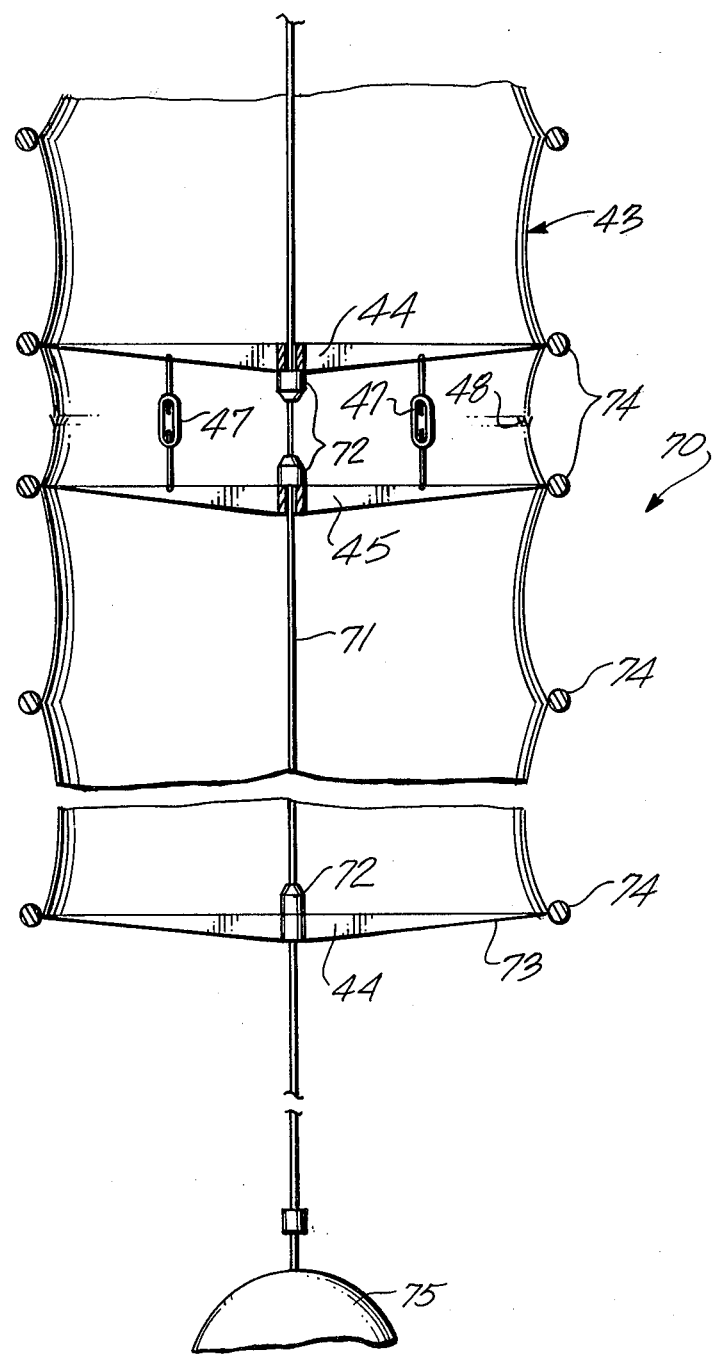
FIG. 7 is a fragmentary longitudinal cross-section view of another duct which is similar to the duct shown in FIG. 3.

FIG. 7 shows another duct 70 which is composed of a plurality of flexible and collapsible wall sections 43 as described above concerning FIGS. 3 and 4. Each wall section has a lower support spider 44 and an upper support spider 45. Duct 70 has a wire rope tensile core 71 on which a plurality of stop bobbins 72 are fixed at desired locations. The bobbins have one flat end and one faired end. The lowermost bobbin has its flat end facing toward the open lower end 73 of the duct; proceeding upwardly along the core, the bobbins alternately have their flat ends disposed upwardly and downwardly. The lower spider 44 of the lowermost wall section abuts the lower end of the lowermost bobbin; the lower spider of all other wall sections abuts the upwardly facing flat end of a bobbin and is held thereagainst by tensioning members, such as turnbuckles 47, engaged between it and the upper spider 45 just below it. In this way, each upper spider 45 is held against the downwardly facing flat end face of its bobbin, and the several wall sections are maintained in their extended positions.

In duct 70, the wall sections have stiffening hoops 74 connected to them at appropriate locations along their length. Hoops 74 are positively buoyant to offset, to the degree desired, the negative buoyancy of the wall sections per se and their support spiders.

A stabilizing mass 75 is connected to the lower end of the core below the lower end of the duct. Mass 75 functions to hold the duct vertical despite the laterally displacing effects of currents flowing past the duct. The weight of the mass is carried entirely by the tensile core of duct 70.

Figure 5:
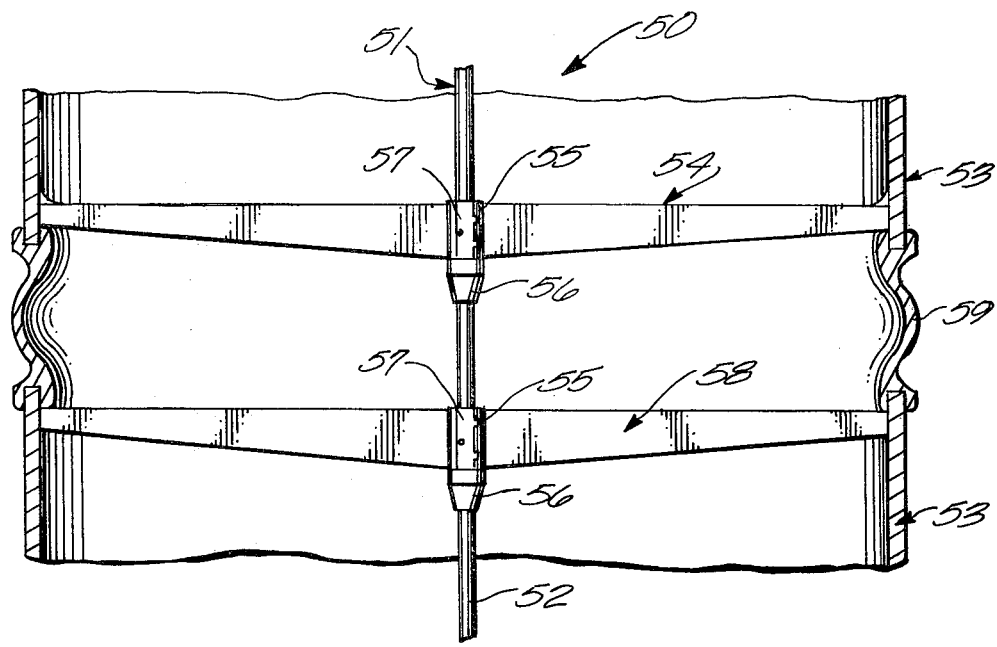
FIG. 5 is a fragmentary longitudinal cross-section view of a portion of another duct according to this invention.

Another upwelling duct 50, shown in FIG. 5 has an elongate tensile core 51 which is defined by a length of wire rope cable 52. Each of a plurality of tubular wall sections 53 is supported at its lower end by a lower spider assembly 54 which transfers the effective weight of the wall section to core 51 by cooperation of a central hub 55 of the spider with the flat upper surface of a bobbin 56 which is secured to the wire rope core at an appropriate location along the length of the core cable. The hub 55 of each lower spider assembly 54, as well as of each upper spider assembly 58, has an openable door 57 which, when open, provides access to a central bore of the hub to enable the spider assembly to be placed on or disconnected from the core in assembly or disassembly of duct 50. The upper spider 58 for each wall section cooperates with a corresponding bobbin 56 on the core, and functions to maintain concentricity of the wall section at its upper end with the core. The upper spider assemblies are not relied upon to transfer any portion of the weight of the wall sections to the core. The upper and lower ends of adjacent wall sections are connected by annular flexible seal members 59.

Duct 50 is fully compliant to bending loads applied laterally to it by ocean current drag forces. Since core 51 is flexible, it does not encounter any bending stresses at all. Any bending stresses encountered in the wall sections are confined to the lengths of the individual wall sections. Core 51 encounters only tensile loads in use.

Figure 6:
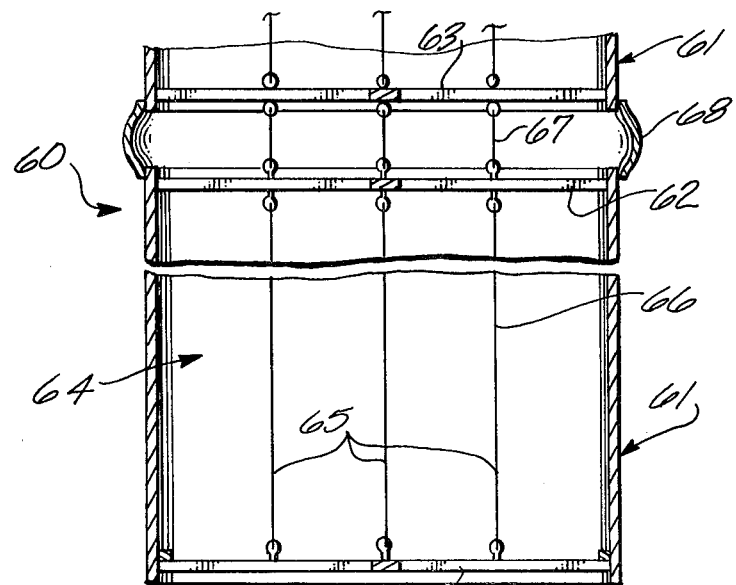
FIG. 6 is a fragmentary longitudinal cross-section view of yet another duct.

Another upwelling duct assembly 60, shown in FIG. 6, includes a plurality of tubular wall sections 61. Each wall section has associated with it an upper spider 62 and a lower spider 63. The lower spiders 63 each carry the weight of the wall section with which it is associated. The upper spiders 62 are centering and positioning devices in the duct. Duct 60 has a core assembly 64 which is composed of a plurality of lengths of wire rope cable 65 effectively connected between the upper and lower spiders of each wall section and between the spiders of adjacent serially aligned wall sections. That is, each of wire rope lengths 65 is actually defined by a series of long wire rope lengths 66 between the spider assemblies for each wall section and a series of short wire rope lengths 67 between the spiders of adjacent wall sections. Adjacent wall sections are interconnected by annular flexible seal members 68. Duct 60 illustrates the point that the tensile core of a duct according to this invention need not be disposed along the axis of the duct, and need not be defined by a single tensile element. A plurality of parallel tensile elements may be used to define the load-carrying core in a duct according to this invention.

Ducts 50 and 60 can be stored very conveniently prior to assembly if the wall sections of these ducts are defined of several arcuate segments similar to those shown in FIG. 2.

Persons skilled in the art to which this invention pertains will appreciate that the preceding description has been presented with reference to presently preferred embodiments of the invention as illustrated in the accompanying drawings. Of the described embodiments, duct 10 is the embodiment which is presently preferred. It will be understood, however, that the present invention can be manifested in embodiments different fro the described embodiments. The preceding description sets forth the presently known best modes of practicing this invention, but certainly not all possible modes. Accordingly, workers skilled in the art to which this invention pertains will readily appreciate that modifications, alterations or variations in the arrangements and procedures described above may be practiced without departing from, and while still relying upon, the essential aspects of this invention.

What is claimed is:

1. A large diameter duct structure adapted for vertical disposition in an ocean comprising
    an elongate tensile core for the duct adapted to be supported at one end thereof and to be disposed downwardly therefrom,
    a plurality of duct wall sections of selected length serially alignable to define a tubular assembly a diameter substantially greater than that of the core,
    support means engageable with the core at selected locations along the core and with the wall sections for supporting the wall sections about the core and for securing the wall sections on the core from movement relatively along the core, and
    seal means engageable between the adjacent ends of adjacent wall sections disposed about and along the core for defining substantially liquid-tight connections between adjacent sections,
    whereby, when the wall sections are disposed about the core in serial arrangement along the core and the seal means are engaged between adjacent sections, there results a fluid flow duct of selected overall length in which the weight of the duct is supported by the core.

2. Apparatus according to claim 1 wherein the seal means are so defined and arranged to be incapable of transmitting significant stress between wall sections between which they are engaged.

3. Apparatus according to claim 2 wherein the seal means are flexible.

4. Apparatus according to claim 1 wherein the wall sections are tubular self-supporting members.

5. Apparatus according to claim 4 wherein the wall sections are composed of arcuate segments.

6. Apparatus according to claim 5 wherein each wall section is composed of at least three substantially semi-circular segments.

7. Apparatus according to claim 1 wherein the core is composed of a plurality of lengths of hollow pipe.

8. Apparatus according to claim 7 including means for coupling the pipe lengths in serial alignment, the coupling means comprising components of the support means.

9. Apparatus according to claim 8 wherein the coupling means comprises an enlarged diameter portion on one end of each pipe length and defining an upwardly open shoulder upon connection of two pipe lengths in assembly of the duct, and the support means comprise an annular open spider for each wall section, each spider being disposable about the core for support thereon by one of said shoulders.

10. Apparatus according to claim 9 wherein the spiders are releasably engageable with the wall sections for support of the wall sections.

11. Apparatus according to claim 9 wherein the spiders are carried by the wall sections.

12. Apparatus according to claim 1 wherein the core is flexible.

13. Apparatus according to claim 12 wherein the core is composed of a length of wire rope, and the support means are arranged for supporting the wall sections concentrically about the core.

14. Apparatus according to claim 12 wherein the core is effectively comprised of a plurality of parallel lengths of wire rope.

15. Apparatus according to claim 1 wherein the wall sections are flexible.

16. Apparatus according to claim 15 wherein the wall sections are comprised of tubes of flexible sheet material and are axially collapsible.

17. Apparatus according to claim 16 including hoop means carried by the tubes at spaced locations therealong.

18. Apparatus according to claim 16 wherein the support means include means extending the tubes from collapsed states thereof on assembly of the duct and for tensioning the tubes as extended.

* * * * *